(12) United States Patent
Wu

(10) Patent No.: US 12,389,446 B2
(45) Date of Patent: Aug. 12, 2025

(54) INFORMATION INDICATION METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 414 days.

(21) Appl. No.: 17/671,254

(22) Filed: Feb. 14, 2022

(65) Prior Publication Data

US 2022/0167395 A1 May 26, 2022

Related U.S. Application Data

(63) Continuation of application No. PCT/CN2019/101190, filed on Aug. 16, 2019.

(51) Int. Cl.
*H04W 74/00* (2009.01)
*H04W 72/23* (2023.01)
(Continued)

(52) U.S. Cl.
CPC ......... *H04W 74/006* (2013.01); *H04W 72/23* (2023.01); *H04W 74/0833* (2013.01); *H04W 74/0836* (2024.01)

(58) Field of Classification Search
CPC .................................................. H04W 74/006
See application file for complete search history.

(56) References Cited

U.S. PATENT DOCUMENTS

2019/0132883 A1 5/2019 You et al.
2019/0149286 A1\* 5/2019 Zhang .................. H04L 5/0007
370/329
(Continued)

FOREIGN PATENT DOCUMENTS

CN 107371273 A 11/2017
CN 109286988 A 1/2019
(Continued)

OTHER PUBLICATIONS

International Search Report issued in corresponding International Application No. PCT/CN2019/101190, mailed May 20, 2020, 27 pages.
(Continued)

*Primary Examiner* — Abdeltif Ajid
(74) *Attorney, Agent, or Firm* — BAYES PLLC

(57) ABSTRACT

An information indication method and apparatus, a device, and a storage medium, relating to the technical field of communications. The method comprises: receiving a random access response (RAR) message (301); and obtaining at least one of first indication information and second indication information from the RAR message, wherein the first indication information is used for determining a target channel access approach corresponding to the target uplink transmission; the second indication information is used for determining the time domain position of the target uplink transmission (302). The target channel access approach and the time domain position corresponding to the target uplink transmission can be determined according to the RAR message, so that a UE can realize random access on an unlicensed spectrum.

8 Claims, 6 Drawing Sheets

(51) Int. Cl.
*H04W 74/0833* (2024.01)
*H04W 74/0836* (2024.01)

(56) References Cited

U.S. PATENT DOCUMENTS

| | | | |
|---|---|---|---|
| 2019/0159249 A1 | 5/2019 | Ahn et al. | |
| 2019/0215864 A1 | 7/2019 | Yang et al. | |
| 2019/0281636 A1* | 9/2019 | Liu | H04W 72/04 |
| 2022/0015120 A1* | 1/2022 | Qiu | H04W 72/1268 |
| 2022/0377791 A1* | 11/2022 | Nogami | H04W 74/006 |

FOREIGN PATENT DOCUMENTS

| | | | |
|---|---|---|---|
| CN | 109863816 A | 6/2019 | |
| CN | 110012539 A | 7/2019 | |
| EP | 3182785 A1 | 6/2017 | |
| WO | 2018088422 A1 | 5/2018 | |
| WO | 2018113739 A1 | 6/2018 | |

OTHER PUBLICATIONS

Written Opinion of the International Searching Authority issued in corresponding International Application No. PCT/CN2019/101190, mailed May 20, 2020, 9 pages.
First Office Action issued in corresponding European application No. 19942149.6, mailed Feb. 28, 2023.
Extended European Search Report issued in corresponding European application No. 19942149.6, mailed Jun. 15, 2022.
Ericsson, "Signaling options of LBT category for Msg3", 3GPP TSG-RAN WG2 #107, Tdoc R2-1910785, Prague, Czech Republic, Aug. 26-30, 2019.
Priority Review issued in corresponding Chinese application No. 202310143837.0, mailed May 30, 2024.
First Office Action issued in corresponding Chinese application No. 202310143837.0, mailed Jun. 21, 2024.

* cited by examiner

INFORMATION INDICATION METHOD AND APPARATUS, DEVICE, AND STORAGE MEDIUM

CROSS REFERENCE TO RELATED APPLICATION

This application is a continuation of International Application No. PCT/CN2019/101190 filed on Aug. 16, 2019, entitled "INFORMATION INDICATION METHOD AND APPARATUS, DEVICE, AND STORAGE MEDIUM," the contents of which are incorporated herein by reference in its entirety.

TECHNICAL FIELD

The present disclosure relates to the field of communication technologies, and in particular to an information indication method, apparatus, device, and storage medium.

BACKGROUND

An unlicensed spectrum is a shared spectrum. In order to enable various communication devices to coexist friendly on an unlicensed spectrum, some countries or regions have stipulated legal requirements that need to be met when the unlicensed spectrum is used.

For example, a Listen-Before-Talk (LBT) principle needs to be followed. That is, a User Equipment (UE) in a random access procedure needs to perform LBT before sending information on the unlicensed spectrum.

In general, the random access procedure typically includes the UE sending Msg1 to a network device. After detecting the Msg1 sent by the UE, the network device sends Random Access Response (RAR) (Msg2) to the UE to indicate an uplink resource used by the UE when sending the next message (Msg3). The UE receives the RAR and sends Msg3 to the network device on the uplink resource indicated by the RAR. After receiving Msg3, the network device sends Msg4 to the UE.

However, there is currently no reasonable design solution for RAR in a random access procedure on an unlicensed spectrum, so that the UE sends Msg3 according to the RAR for random access.

SUMMARY

Embodiments of the present disclosure provide an information indication method, apparatus, device, and storage medium, which can be used to solve problems such as realizing random access on an unlicensed spectrum. The technical solution is as follows.

In a first aspect, there is provided an information indication method, which is applied to a terminal. The method includes: receiving a random access response (RAR) message; and obtaining at least one of first indication information and second indication information from the RAR message, wherein the first indication information is used for determining a target channel access mode corresponding to a target uplink transmission, and the second indication information is used for determining a time domain position of the target uplink transmission.

In a second aspect, there is provided an information indication method, which is applied to a terminal. The method includes: sending a random access response (RAR) message, wherein the RAR message carries at least one of first indication information and second indication information, and wherein the first indication information is used for determining a target channel access mode corresponding to a target uplink transmission, and the second indication information is used for determining a time domain position of the target uplink transmission.

In a third aspect, there is provided an information indication apparatus, which is configured in a terminal, and includes: a receiving module, configured to receive a random access response (RAR) message; and an obtaining module, configured to obtain at least one of first indication information and second indication information from the RAR message, wherein the first indication information is used for determining a target channel access mode corresponding to a target uplink transmission, and the second indication information is used for determining a time domain position of the target uplink transmission.

In a fourth aspect, there is provided an information indication apparatus, which is configured in a terminal, and includes: a sending module, configured to send a random access response (RAR) message, wherein the RAR message carries at least one of first indication information and second indication information, and wherein the first indication information is used for determining a target channel access mode corresponding to a target uplink transmission, and the second indication information is used for determining a time domain position of the target uplink transmission.

In a fifth aspect, there is provided a communication system, including a terminal and a network device, wherein the terminal includes any of the apparatuses described in the third aspect, and the network device includes any of the apparatuses described in the fourth aspect.

In a sixth aspect, there is provided a terminal, including a processor and a memory, wherein the memory stores at least one instruction, and the at least one instruction is used to be executed by the processor to implement any one of the methods described in the first aspect.

In a seventh aspect, there is provided a network device, including a processor and a memory, wherein the memory stores at least one instruction, and the at least one instruction is used to be executed by the processor to implement any one of the methods described in the second aspect.

In an eighth aspect, there is provided a computer-readable storage medium having instructions stored thereon, wherein the instructions, when executed by a processor, implement the method described in the first aspect.

In a ninth aspect, there is provided a computer-readable storage medium having instructions stored thereon, wherein the instructions, when executed by a processor, implement the method described in the second aspect.

In a tenth aspect, there is provided a computer program product containing instructions, wherein the instructions, when run on a computer, cause a computer to execute the method described in the first aspect.

In an eleventh aspect, there is provided a computer program product containing instructions, wherein the instructions, when run on a computer, cause a computer to execute the method described in the second aspect.

The beneficial effects brought by the technical solutions provided by embodiments of the present disclosure are at least as follows. The random access response (RAR) message is received, and at least one of the first indication information and the second indication information is obtained from the RAR message. The first indication information is used for determining the target channel access mode corresponding to the target uplink transmission, and the second indication information is used for determining the time domain position of the target uplink transmission.

That is, the target channel access mode and the time domain position corresponding to the target uplink transmission can be determined through the RAR message, which enables the UE to implement random access on an unlicensed spectrum.

BRIEF DESCRIPTION OF THE DRAWINGS

In order to explain technical solutions in embodiments of the present disclosure more clearly, the following will briefly introduce drawings needed in the description of these embodiments. Obviously, the drawings in the following description are only some embodiments of the present disclosure. For those of ordinary skill in the art, other drawings can be obtained from these drawings without creative labor.

DETAILED DESCRIPTION

Figure 1:
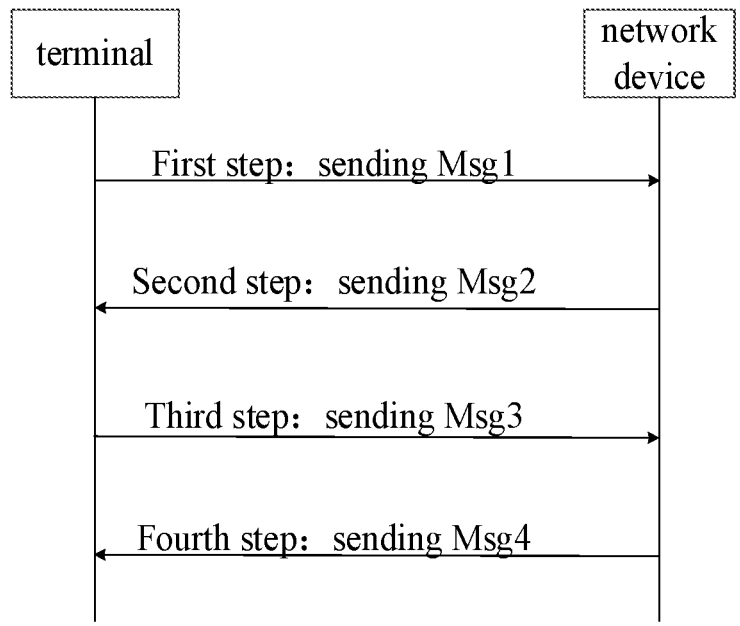
FIG. 1 is a flowchart of a four-step random access procedure provided by an exemplary embodiment of the present disclosure.

In order to make objectives, technical solutions, and advantages of the present disclosure clearer, the following will further describe embodiments of the present disclosure in detail with reference to the drawings.

Before describing an information indication method provided by embodiments of the present disclosure in detail, terms and implementation environment involved in embodiments of the present disclosure are briefly described first.

First, terms involved in embodiments of the present disclosure is described briefly.

Unlicensed spectrum: a spectrum specified by countries and regions to be used for communication of radio devices. This spectrum is generally regarded as a shared spectrum. That is, communication devices in different communication systems can use this spectrum without applying for exclusive spectrum authority from the government, as long as they meet the regulatory requirements set by countries or regions on this spectrum.

Cat-1 LBT: a LBT mode in which a communication device directly performs transmission without channel detection after a time gap ends.

Cat-2 LBT: a channel access mode in which the communication device performs single-slot channel detection. Furthermore, Cat-2 LBT can be classified into 25 microseconds Cat-2 LBT and 16 microseconds Cat-2 LBT according to different detection time intervals.

Cat-3 LBT: a channel access mode of the communication device being multi-slot channel detection based on random back-off with a contention window of fixed size Cat-4 LBT: a channel access mode of the communication device being multi-slot channel detection based on random back-off with a contention window of variable size. Furthermore, Cat-4 LBT can include different channel access priority classes according to different priority classes of the transmission service.

For example, see table 1, wherein the table 1 shows channel access parameters corresponding to different channel access priority classes under Cat-4 LBT, where the smaller the value of p, the higher the channel access priority class.

TABLE 1

| Channel Access Priority Class | m | CW-min | CW-max | Tmcot | allowed CW values |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

It should be noted that in the above table 1, m refers to a number of back-off slots corresponding to the channel access priority class, CW refers to size of a contention window corresponding to the channel access priority class. CWmin refers to a minimum value of CW corresponding to the channel access priority class, CWmax refers to a maximum value of CW corresponding to the channel access priority class, and Tmcot refers to the duration of maximum channel occupancy time corresponding to the channel access priority class p. It should be understood that table 1 is only an example, and channel access parameters under different channel access priority classes may also have other values.

Next, the UE (also called terminal) accessing to the network device is taken as an example to briefly introduce a random access procedure. Reference is made to FIG. 1, and the random access procedure typically includes the following four steps.

In a first step, the UE sends Msg1 to the network device, and the Msg1 is a random access preamble sequence (i.e., preamble).

The UE sends Msg1 to the network device to notify the network device that there is a random access request, and at the same time enables the network device to estimate a transmission delay between itself and the UE, and to use such transmission delay for calibrating an uplink time.

As an example, resource information for sending Msg1 can be obtained through Random Access Channel (RACH) resource configuration. In Rel-15 New Radio (NR) technologies, RACH resource configuration information configured for UE access is defined, including 256 types. The cell can indicate the RACH resource configuration information used by itself to the UE in a system message. Each type of RACH resource configuration information includes a preamble format, a period, a radio frame offset, a sub-frame number in a radio frame, a starting symbol in a sub-frame, the number of PRACH slots in a sub-frame, the number of PRACH timings in a PRACH slot, and the duration of PRACH timing. Through the above information, time, frequency, and code information of the PRACH resource can be determined. In this way, the UE can send Msg1 on a respective PRACH resource according to the RACH resource configuration information indicated by the network device.

In a second step, after detecting Msg1 sent by the UE, the network device sends a Random Access Response (RAR) (Msg2) to the UE to inform the UE of uplink resource information that can be used when sending the next message (Msg3).

One RAR may include response messages to multiple UEs that send preambles. The response message to each UE includes a RAP ID used by each UE, resource allocation information of Msg3, Time Advance (TA) information, etc.

In addition, the network device can also perform other operations, such as assigning a temporary Radio Network Temporary Identity (RNTI) to the UE, etc., which will not be introduced here in detail.

In a third step, the UE receives the RAR and sends Msg3 to the network device on the uplink resource indicated by the RAR.

In some embodiments, the UE may listen to the PDCCH in a search space within a RAR time window corresponding to the RAR, so as to receive the RAR. The RAR time window can be configured by higher layer parameters, and configuration information of the search space of the PDCCH can be indicated by a system message.

If the UE does not receive the RAR sent by the network device within the RAR time window, it is considered that the random access procedure has failed. If the UE receives a RAR and a preamble index in the RAR is the same as a preamble index sent by the UE, it is considered that the RAR has been successfully received. In this case, the UE can stop listening to the RAR, and the UE sends Msg3 to the network device.

As an example, Msg3 may carry UE-specific temporary identity information or a UE identity from the core network.

For example, the UE identity may be the Serving-Temporary Mobile Subscriber Identity (S-TMSI) or a random number.

In a fourth step, after receiving Msg3, the network device sends Msg4 to the UE.

As an example, the Msg4 includes a contention resolution message and also includes information about the uplink transmission resources allocated to the UE.

In some embodiments, in a conflict resolution mechanism, the network device may carry a unique identity in the Msg4 to indicate the UE that has won the contention. When receiving the Msg4 sent by the base station, the UE may detect whether the temporary identity information sent by the UE in Msg3 is included in the contention resolution message sent by the network device. If so, it indicates that the random access procedure of the UE is successful. Otherwise, it is considered that the random access procedure has failed, and the UE needs to initiate the random access procedure again starting from the first step.

The above description is only a four-step random access procedure as an example. In another embodiment, in order to shorten a time delay of the random access procedure, a two-step random access procedure is proposed. The two-step random access procedure is as follows. The UE sends MsgA to the network device, and the network device sends MsgB to the UE. A possible design of MsgA is to include a preamble and uplink data, and the uplink data may be carried by PUSCH. As an example, the uplink data may include UE identity information (such as the temporary identity information) and a reason for Radio Resource Control (RRC) request. MsgA is equivalent to Msg1 and Msg3 in the four-step random access procedure.

In addition, MsgB contains conflict resolution information, TA information, Cell Radio Network Temporary Identify (C-RNTI) allocation information, etc. MsgB is equivalent to Msg2 and Msg4 in the four-step random access procedure.

Next, the implementation environment involved in embodiments of the present disclosure will be briefly introduced.

The technical solutions according to embodiments of the present disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, advanced LTE (LTE-A) system, New Radio (NR) system, evolution system of NR system, LTE-based access to unlicensed spectrum (LTE-U) system, NR-based access to unlicensed spectrum (NR-U) system, Universal Mobile Telecommunication System (UMTS), Worldwide Interoperability for Microwave Access (WiMAX) communication system, wireless local area network (WLAN), wireless fidelity (WiFi), next-generation communication system or other communication systems.

Generally speaking, traditional communication systems support a limited number of connections and are easy to implement. However, with the development of communication technologies, mobile communication systems will not only support traditional communication, but also support, for example, device to device (D2D) communication, machine-to-machine (M2M) communication, machine-type communication (MTC), vehicle-to-vehicle (V2V) communication, and the like. Embodiments of the present disclosure can also be applied to these communications system.

A system architecture and service scenario described in embodiments of the present disclosure are used for describing the technical solutions in embodiments of the disclosure more clearly and not intended to limit the technical solutions provided in embodiments of the disclosure. Those of ordinary skill in the art should know that, along with the evolution of network architectures and emergence of new service scenarios, the technical solutions provided in embodiments of the disclosure are also applied to similar technical problems.

Figure 2:
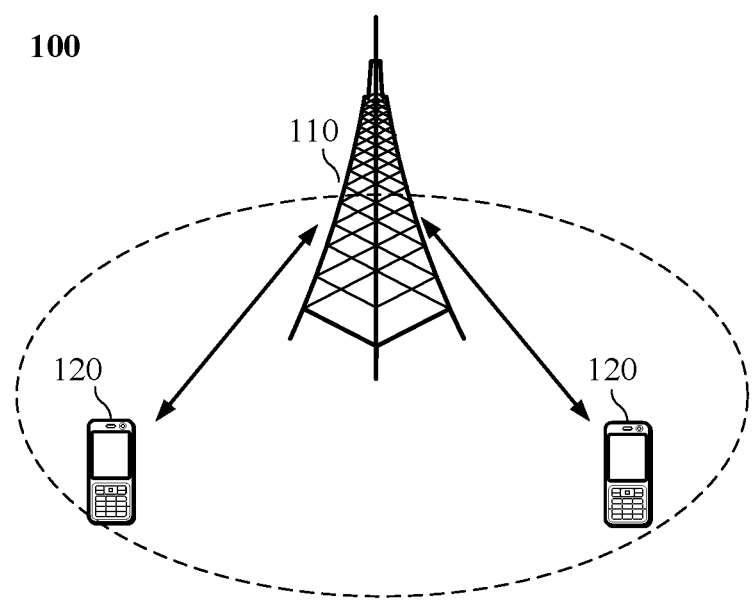
FIG. 2 is a schematic diagram of an implementation environment provided by another exemplary embodiment of the present disclosure.

Exemplarily, a communication system 100 applied in an embodiment of the present disclosure is shown in FIG. 2. The communication system 100 may include a network device 110. The network device 110 may be a device communicating with a terminal 120 (or referred to as a communication terminal or a terminal). The network device 110 may provide communication coverage over a specific geographic region, and may communicate with the terminal located within the coverage region. Optionally, the network device 110 may be an evolutional node B (eNB or eNodeB) in a long term evolution (LTE) system, or a radio controller in a cloud radio access network (CRAN). Alternatively, the network device may be a mobile switching center, a relay station, an access point, a vehicle device, a wearable device, a concentrator, a switchboard, a network bridge, a router, a network-side device in a 5th generation (5G) network, or a network device in a future communication system, and the like.

The communication system 100 further includes at least one terminal 120 located within a coverage range of the network device 110. The "terminal" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network, and an AM-FM broadcast transmitter; and/or an apparatus of another terminal, which is configured to receive/transmit a communication signal; and/or an Internet of things (IoT) device. The terminal configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a radiotelephone, a pager, an Internet/intranet access, a Web browser, a notepad, a calendar, and/or a personal digital assistant (PDA) of a global positioning system (GPS) receiver; and a conventional laptop and/or palmtop receiver or other electronic apparatuses including radiotelephone transceivers. The terminal may refer to an access terminal, UE, a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device or other processing devices connected to a radio modem, a vehicle device, a wearable device, a terminal in a 5G network, or a terminal in the PLMN that will be evolved in the future, and the like.

Optionally, device to device (D2D) communication may be realized among the terminals 120.

Optionally, a 5G communication system or 5G network may also be referred to as a new radio (NR) system or NR network.

FIG. 2 exemplarily illustrates one network device and two terminals. Optionally, the communication system 100 may include a plurality of network devices, and a coverage range of each network device may include other numbers of terminals, which is not limited by embodiments of the present disclosure.

Optionally, the communication system 100 may further include other network entities such as a network controller and a mobility management entity. No limitation is made thereto in embodiments of the present disclosure.

It is to be understood that a device with a communication function in the network/system in embodiments of the present disclosure may be called a communication device.

For example, for the communication system 100 shown in FIG. 1, the communication devices may include the network device 110 and the terminal 120 with the communication function, and the network device 110 and the terminal 120 may be the specific devices mentioned above and will not be elaborated herein. The communication devices may further include other devices in the communication system 100, for example, other network entities like a network controller and a mobility management entity. No limitation is made thereto in embodiments of the present disclosure.

After introducing the terms and implementation environment involved in embodiments of the present disclosure, an information indication method provided by embodiments of the present disclosure will be described in detail below in conjunction with the accompanying drawings.

Figure 3:
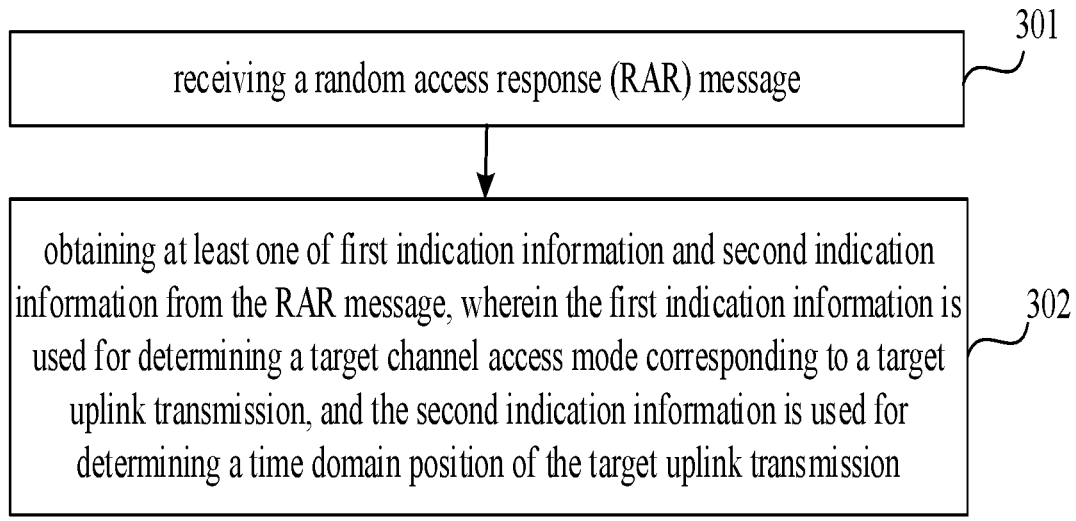
FIG. 3 is a flowchart of an information indication method provided by an exemplary embodiment of the present disclosure.

Please refer to FIG. 3, which is a flowchart showing an information indication method according to an exemplary embodiment. The information indication method can be applied to the implementation environment shown in FIG. 2, and can include at least part of the following contents.

In step 301, a random access response (RAR) message is received.

Specifically, the terminal receives the RAR message sent by the network device. Based on the RAR message, a frequency domain resource and a time domain resource used by the terminal to send Msg3 can be determined. The RAR message can also allocate Temporary C-RNTI (TC-RNTI) to the terminal, and provide a TA command to the terminal, etc.

Optionally, if the terminal does not detect the RAR message sent by the network device within a RAR time window, the terminal can re-transmit a Physical Random Access Channel (PRACH) sequence, and detect the RAR message after the PRACH retransmission.

In step 302, at least one of first indication information and second indication information is obtained from the RAR message, wherein the first indication information is used for determining a target channel access mode corresponding to a target uplink transmission, and the second indication information is used for determining a time domain position of the target uplink transmission.

As an example, the target uplink transmission is a PUSCH of Msg3 in the random access procedure.

It should be noted that in the two-step random access procedure, the random access procedure may be completed after the network device sends MsgB, and the terminal may also need to send other uplink signals or uplink channels after receiving MsgB. Thus, the target uplink transmission may also be the PUCCH, an uplink reference signal such as SRS or the PUSCH without Msg3.

In an embodiment of the present disclosure, the target uplink transmission includes transmission of a target uplink channel or transmission of a target uplink signal. The target uplink channel may include at least one of a physical uplink control channel (PUCCH), a physical uplink shared channel (PUSCH), and the like. The target uplink signal may include at least one of an uplink demodulation reference signal (DMRS), a sounding reference signal (SRS), a phase tracking reference signal (PT-RS), and the like. The uplink DMRS can be used for uplink channel demodulation, SRS can be used for uplink channel measurement, uplink time-frequency synchronization or phase tracking, and PT-RS can also be used for uplink channel measurement, uplink time-frequency synchronization or phase tracking. It should be understood that embodiments of the present disclosure may include uplink channels or uplink signals with the same names and different functions as the foregoing, and may also include uplink channels or uplink signals with different names and the same function as the foregoing, which is not limited in the present disclosure.

In the present disclosure, the target uplink transmission being the PUSCH of Msg3 in the random access procedure is taken as an example for description.

The target channel access mode may refer to a LBT mode that the terminal needs to perform before sending Msg3. As mentioned above, before sending the target uplink transmission, the UE needs to perform LBT, i.e., determining the channel access mode. Since there can be multiple channel access modes (for example, including Cat-1 LBT, Cat-2 LBT, etc.), the first indication information needs to be used to indicate the target channel access mode used by the terminal to send Msg3.

In addition, since the terminal needs to transmit Msg3 on the PUSCH, in addition to determining the target channel access mode, it also needs to determine the time domain position of the PUSCH.

To this end, after receiving the RAR message, the terminal parses the RAR message to obtain at least one of the first indication information and the second indication information from the RAR. When the RAR message carries only one of the first indication information and the second indication information, the other indication information can be determined in other ways.

For example, the other indication information can be preset, or can be indicated to the terminal by the network device through a higher layer signaling.

In an embodiment of the present disclosure, the higher layer signaling includes at least one of radio resource control (RRC) information and media access control (MAC) control element (CE) information.

A specific implementation for obtaining at least one of the first indication information and the second indication information from the RAR message may include: obtaining at least one of the first indication information and the second indication information from a redundant bit in the RAR message.

On the one hand, when at least one of the first indication information and the second indication information is directly added to the RAR message, a size of the RAR message will change. That is, the data length will become longer, resulting in a larger RAR overhead. On the other hand, because transmission power of a signal is limited on the unlicensed spectrum, a coverage range of a system that uses the unlicensed spectrum for communication transmission is usually small.

For example, the unlicensed spectrum is suitable for deployment of small cells. Accordingly, information that needs to be carried in the RAR message can also be reduced.

For example, the TA range becomes smaller, so that the required TA command field is relatively small. Therefore, at least one of the first indication information and the second indication information can be carried by the redundant bit in the RAR message.

Figure 4:
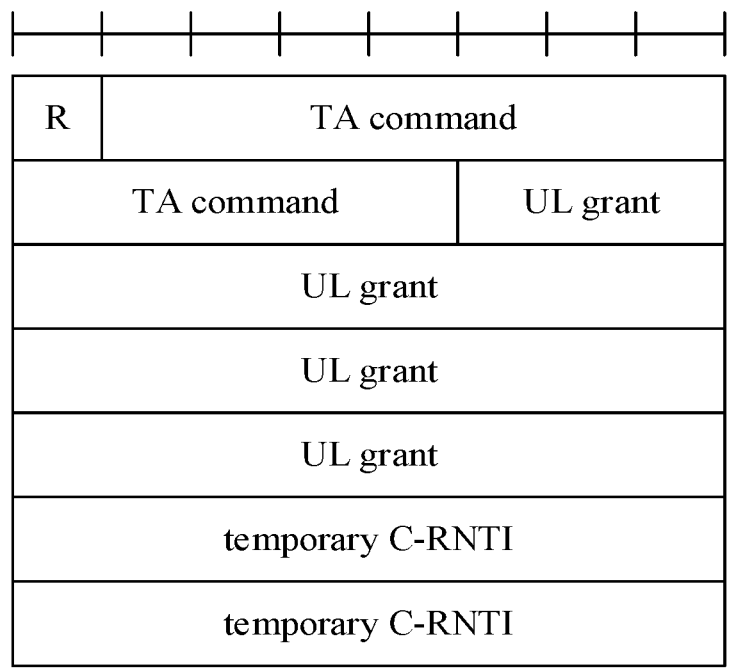
FIG. 4 is a schematic structural diagram of a RAR message provided by an exemplary embodiment of the present disclosure.

As an example, the redundant bit may be located in a TA command field. Generally speaking, the size of each RAR message is fixed at 56 bits. As shown in FIG. 4, the RAR message can consist of a reserved bit R, the TA command field with 12 bits, the uplink scheduling grant with 27 bits, and the TC-RNTI with 16 bits. Since the coverage range of the system that uses the unlicensed spectrum for communication transmission is usually small, the TA command field required in the RAR message is also relatively small. That is, the TA command field with 12 bits in the system that performs communication transmission on the unlicensed spectrum has a redundant bit. Therefore, at least one of the first indication information and the second indication information may be carried by the redundant bit in the TA command field.

Further, the first indication information may be obtained through some bits in the TA command field in the RAR message. Alternatively, the first indication information may be obtained through all bits in the TA command field in the RAR message.

In other words, some bits of the TA command field may be used to carry the first indication information, or all bits in the TA command field may be used to carry the first indication information.

Further, the first indication information may be obtained through some bits located in a head part of the TA command field. Alternatively, the first indication information may be obtained through some bits located in a tail part of the TA command field.

Figure 5:
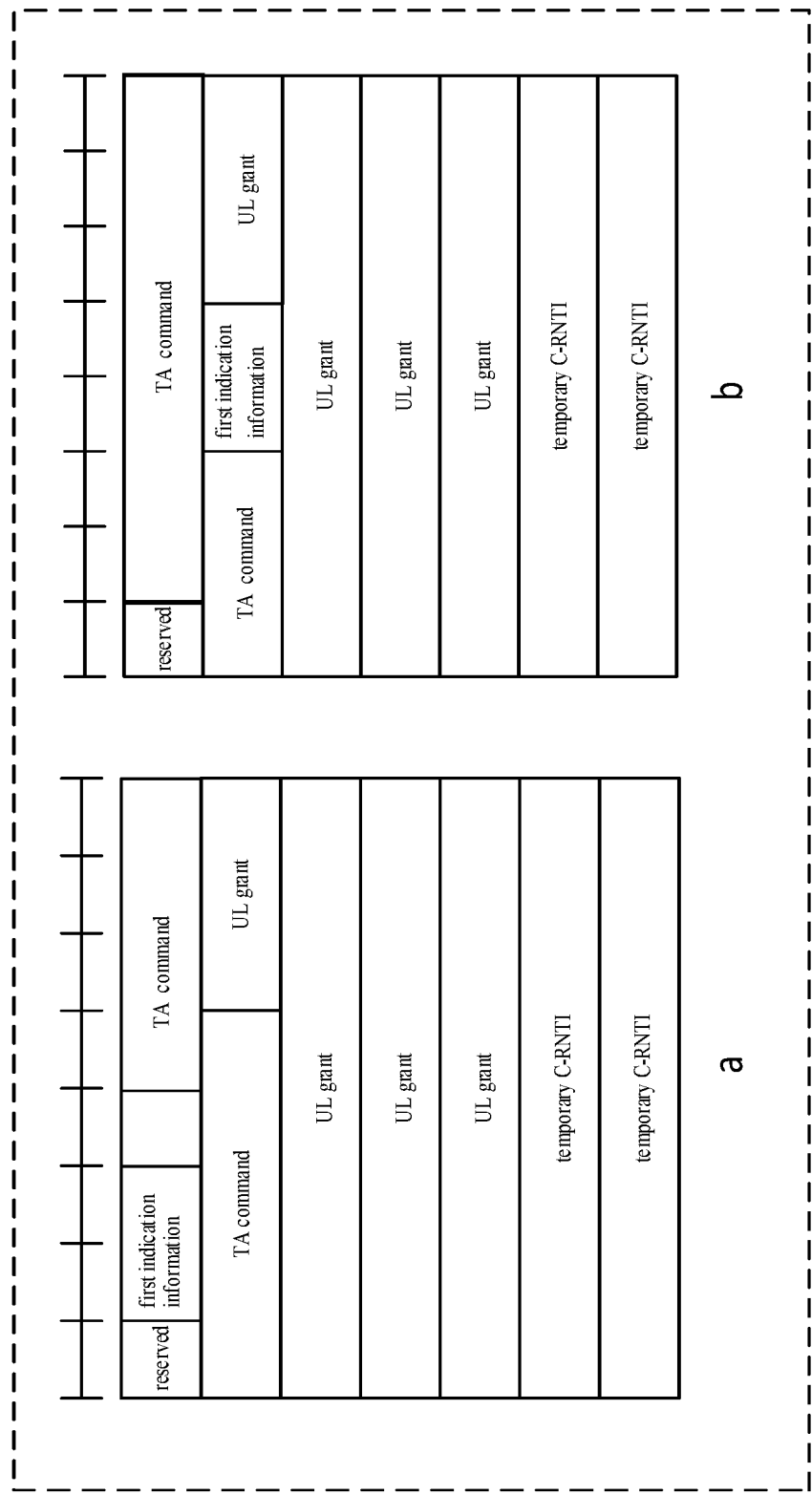
FIG. 5 is a schematic diagram of first indication information provided by an exemplary embodiment of the present disclosure.

That is to say, in a case where the first indication information can be obtained through some bits in the TA command field in the RAR message, the head part of the TA command field can be used to carry the first indication information, as shown in FIG. 5(*a*). In this case, the terminal can extract information of some bits located in the head part of the TA command field to obtain the first indication information. Further, the tail part of the TA command field can be used to carry the first indication information, as shown in FIG. 5(*b*). In this case, the terminal extracts information of some bits located in the tail part of the TA command field to obtain the first indication information.

It should be noted that the first indication information may also be obtained through some bits in middle part of the TA command field. In this case, the terminal extracts some bits located in the middle part of the TA command field to obtain the first indication information.

It should be noted that the above description only takes the redundant bit being in the TA command field as an example. In another embodiment, the redundant bit may also be located in another unused information field other than the TA command field in the RAR message, which is not limited by embodiments of the present disclosure.

In addition, it should also be noted that the above description only takes at least one of the first indication information and the second indication information being carried by the redundant bit in the RAR message as an example. In another embodiment, it is also possible to directly add at least one of the first indication information and the second indication information to the RAR message, which is not limited by embodiments of the present disclosure.

As an example, the foregoing target channel access mode is a channel access mode in a group of channel access modes, and the group of channel access modes includes at least two channel access modes.

Further, the group of channel access modes is indicated by the network device or preset. That is to say, the group of channel access modes may be pre-agreed. Alternatively, it may be indicated and grouped by the network device according to an actual situation. Optionally, in a case where the group of channel access modes is indicated by the network device, the indication signaling may be a higher layer signaling.

It is certain that there may be multiple channel access modes. But for the terminal, not all channel access modes may be applicable.

For example, only three channel access modes are applicable to the terminal. In this case, if all channel access modes are indicated by the first indication information, more bits are needed to carry the first indication information, which causes a large overhead. Therefore, grouping may be required. That is, several channel access modes applicable to the terminal can be grouped into one group of channel access modes or multiple groups of channel access modes, and the first indication information can be used for indicating the channel access mode in the group of channel access modes. In general, the group of channel access modes includes two or more channel access modes.

In some embodiments, the group of channel access modes includes one of the following situations: a first type of channel access mode, a second type of channel access mode, and a third type of channel access mode; or a first type of channel access mode and a second type of channel access mode. The first type of channel access mode includes at least one channel access priority class, and the second type of channel access mode includes at least one detection time interval.

In some embodiments, the first type of channel access mode refers to Cat-4 LBT. That is, the channel detection mode of the communication device is a channel access mode of multi-slot channel detection based on random back-off with a contention window of variable size. Cat-4 LBT can be classified into different channel access priority classes according to the priority class of the transmission service. As shown in table 1, the channel access priority class in Cat-4 LBT can have priority class 1, priority class 2, priority class 3 and priority class 4. The second type of channel access mode refers to Cat-2 LBT, that is, a channel access mode in which the communication device performs single-slot channel detection. Cat-2 LBT can be classified into 25 microseconds Cat-2 LBT and 16 microseconds Cat-2 LBT according to different detection time intervals. The third type of channel access mode refers to Cat-1 LBT, that is, a channel access mode in which the communication device directly performs transmission without channel detection after a time gap ends.

That is, in the first case, the group of channel access modes can consist of one or more of Cat-4 LBT with priority class 1, Cat-4 LBT with priority class 2, Cat-4 LBT with priority class 3, and Cat-4 LBT with priority class 4; one or two of 25 microseconds Cat-2 LBT and 16 microseconds Cat-2 LBT; and Cat-1 LBT. In the second case, the group of channel access modes can also include one or more of Cat-4 LBT with priority class 1, Cat-4 LBT with priority class 2, Cat-4 LBT with priority class 3, and Cat-4 LBT with priority class 4; and one or two of 25 microseconds Cat-2 LBT and 16 microseconds Cat-2 LBT.

Further, the group of channel access modes may also include a first type of channel access mode and a second type of channel access mode. The first type of channel access mode includes one channel access priority class, and the second type of channel access mode includes one detection time interval.

The channel access priority class included in the first type of channel access mode may be one of priority class 1, priority class 2, priority class 3, and priority class 4. The detection time interval included in the second type of channel access mode may be one of 25 microseconds and 16 microseconds.

That is, the group of channel access modes may also include a third case. That is, it consists of Cat-4 LBT including one channel access priority class and Cat-2 LBT including one detection time interval.

For example, the group of channel access modes may include 25 microseconds Cat-2 LBT and Cat-4 LBT with priority class 1.

The first indication information is used for indicating a channel access mode in the group of channel access modes. The network device can negotiate with the terminal about which group of channel access modes to use. According to different groups of channel access modes as used, the number of bits included in the first indication information may also be different, and the indication methods may also be different.

In some embodiments, the first indication information may include N bits, and the N bits are used for indicating the LBT mode and/or the LBT priority class. Assuming that the group of channel access modes includes one of 25 microseconds Cat-2 LBT and 16 microseconds Cat-2 LBT, and one priority class in Cat-4 LBT, for example, including 25 microseconds Cat-2 LBT and the highest channel access priority class (p=1) in Cat-4 LBT. Then the N can be taken as 1, and the 1 bit is used for indicating that the LBT is 25 microseconds Cat-2 LBT or the highest channel access priority class in Cat-4 LBT.

As another example, when the group of channel access modes is the first case described above, the value of N that the first indication information can include may be 2 bits, and the specific indications for the first group of channel accesses can be as shown in table 2 below, where Cat-4 LBT only supports one priority class.

TABLE 2

| first indication information | channel access mode |
|---|---|
| N = 00 | Cat-1 LBT |
| N = 01 | 16 microseconds Cat-2 LBT |
| N = 10 | 25 microseconds Cat-2 LBT |
| N = 11 | the highest priority class in Cat-4 LBT |

Optionally, the first indication information includes a channel access type and a channel access parameter of the target channel access mode. In a case where the channel access type is the first type of channel access, the channel access parameter includes at least one channel access priority class. In a case where the channel access type is the second type of channel access, the channel access parameter includes at least one detection time interval.

That is, the first indication information includes two parts, one part is used for indicating which channel access type is used, and the other part is used for indicating the channel access parameter. For example, the channel access parameter can be the channel access priority class and/or the detection time interval.

For example, the first indication information includes 3 bits, of which 1 bit is used for indicating that the channel access mode type is Cat-2 LBT or Cat-4 LBT, and 2 bits are used for indicating the channel access priority class and/or the detection time interval under different types. The specific indication situations can be shown in table 3 below.

TABLE 3

| first indication information | Cat-2 LBT (N1 = 0) | Cat-4 LBT (N1 = 1) |
|---|---|---|
| N2 = 00 | 25 microseconds | priority class 1 |
| N2 = 01 | 16 microseconds | priority class 2 |
| N2 = 10 | reserved | priority class 3 |
| N2 = 11 | reserved | priority class 4 |

Optionally, for the third case described above, the first indication information may include 2 bits. In this case, the specific indications for the group of channel access modes may be as shown in table 4.

TABLE 4

| first indication information | Cat-2 LBT (N1 = 0) | Cat-4 LBT (N1 = 1) |
| --- | --- | --- |
| N2 = 0 | 25 microseconds | priority class 1 |
| N2 = 1 | 16 microseconds | priority class 2 |

After introducing the first instruction information, the second instruction information will be introduced next. As an example, the second indication information may include a first offset value in a set of offset values, and the first offset value is used for determining the time domain position of the target uplink transmission.

In the licensed spectrum, the time domain position of the target uplink transmission is determined according to a designated offset value and K2 value, where the K2 value is determined according to a PUSCH time domain resource allocation field, and the designated offset value is related to the subcarrier interval of PUSCH, as shown in Table 5.

TABLE 5

| μPUSCH | designated offset value | subcarrier interval |
| --- | --- | --- |
| 0 | 2 | 15 kHz |
| 1 | 3 | 30 kHz |
| 2 | 4 | 60 kHz |
| 3 | 6 | 120 kHz |

However, in the unlicensed spectrum, since data transmission is opportunistic transmission, there are downlink transmission opportunities. The downlink transmission opportunity refers to a group of downlink transmissions performed by the network device, and one group of downlink transmissions includes one or more downlink transmissions. When one group of downlink transmissions includes multiple downlink transmissions, there is no time gap or a time gap less than or equal to 16 microseconds between the multiple downlink transmissions. If the time gap between two downlink transmissions is greater than 16 microseconds, then the two downlink transmissions are considered to be two downlink transmission opportunities.

Therefore, after the network device preempts the channel, it may send an indefinite number of downlink channels after sending the RAR message. That is, because there is an opportunistic transmission on the unlicensed spectrum, a time interval between the terminal receiving the RAR message (wherein the RAR message includes uplink scheduling grant information of Msg3) and the sending of Msg3 on the unlicensed spectrum may be longer than a time interval between the terminal receiving the RAR message and the sending of Msg3 on the licensed spectrum. That is, because the downlink transmission opportunity cannot be determined, the method in which the designated offset value and K2 indicate the time domain position of the target uplink transmission is no longer suitable for the unlicensed spectrum.

For this reason, the time domain position of the target uplink transmission needs to be determined according to the first offset value and the K2 value. As different from the above designated offset value, the first offset value is not a fixed value, but a value in the set of offset values corresponding to different subcarrier intervals. As an example, as shown in table 6:

TABLE 6

| μPUSCH | set of first offset values | subcarrier interval |
| --- | --- | --- |
| 0 | {12, 4, 6, 8} | 15 kHz |
| 1 | {13, 6, 12, 16} | 30 kHz |
| 2 | {14, 8, 16, 24} | 60 kHz |

The set of offset values corresponds to the first subcarrier interval. Optionally, the first subcarrier interval is a subcarrier interval corresponding to the target uplink transmission. In other words, the set of offset values is a set of offset values which is in correspondence with the subcarrier interval corresponding to the target uplink transmission.

For example, taking table 6 as an example, when the subcarrier interval used for the target uplink transmission is 30 kHz, the set of offset values is {3, 6, 12, 16}.

Optionally, there is a one-to-one correspondence between different subcarrier intervals and different sets of offset values.

Optionally, multiple subcarrier intervals correspond to the same set of offset values.

The set of offset values may be indicated by the network device or preset. In other words, the set of offset values may be preset, or may be set by the network device. Optionally, in a case where the set of offset values is indicated by the network device, the indication signaling may be a higher layer signaling.

Optionally, the terminal obtains a second offset value in the PUSCH time domain resource allocation field in the uplink scheduling grant in the RAR message, and the second offset value and the first offset value are used for jointly determining the time domain position of the target uplink transmission.

The second offset value is the K2 value, and the second offset value can be obtained from the PUSCH time domain resource allocation field in the uplink scheduling grant in the RAR message. The terminal sums the first offset value and the second offset value to obtain the time domain position of the target uplink transmission on the unlicensed spectrum.

In some embodiments, a third offset value is obtained from the PUSCH time domain resource allocation field in the uplink scheduling grant in the RAR message, and the third offset value is used for indicating a time interval between an end slot of a downlink transmission opportunity to which the RAR message belongs and a slot to which the target uplink transmission belongs. The third offset value is determined as the second indication information.

In other words, a time indicated by the third offset value is no longer calculated from a slot in which scheduling information of the RAR is received, but is calculated from the end position of the downlink transmission opportunity where the RAR is located. In this way, it can be ensured that for different downlink transmission opportunities, the network device indicates a respective third offset value for the terminal.

Optionally, the second indication information is obtained through some bits in the TA command field in the RAR message. Alternatively, the second indication information is obtained through all bits in the TA command field in the RAR message.

That is, the principle for obtaining the second indication information is similar to the principle for obtaining the first indication information, and some or all of the bits in the TA command field can be used to obtain the second indication information.

The second indication information is obtained through some bits in the middle part of the TA command field.

Figure 6:
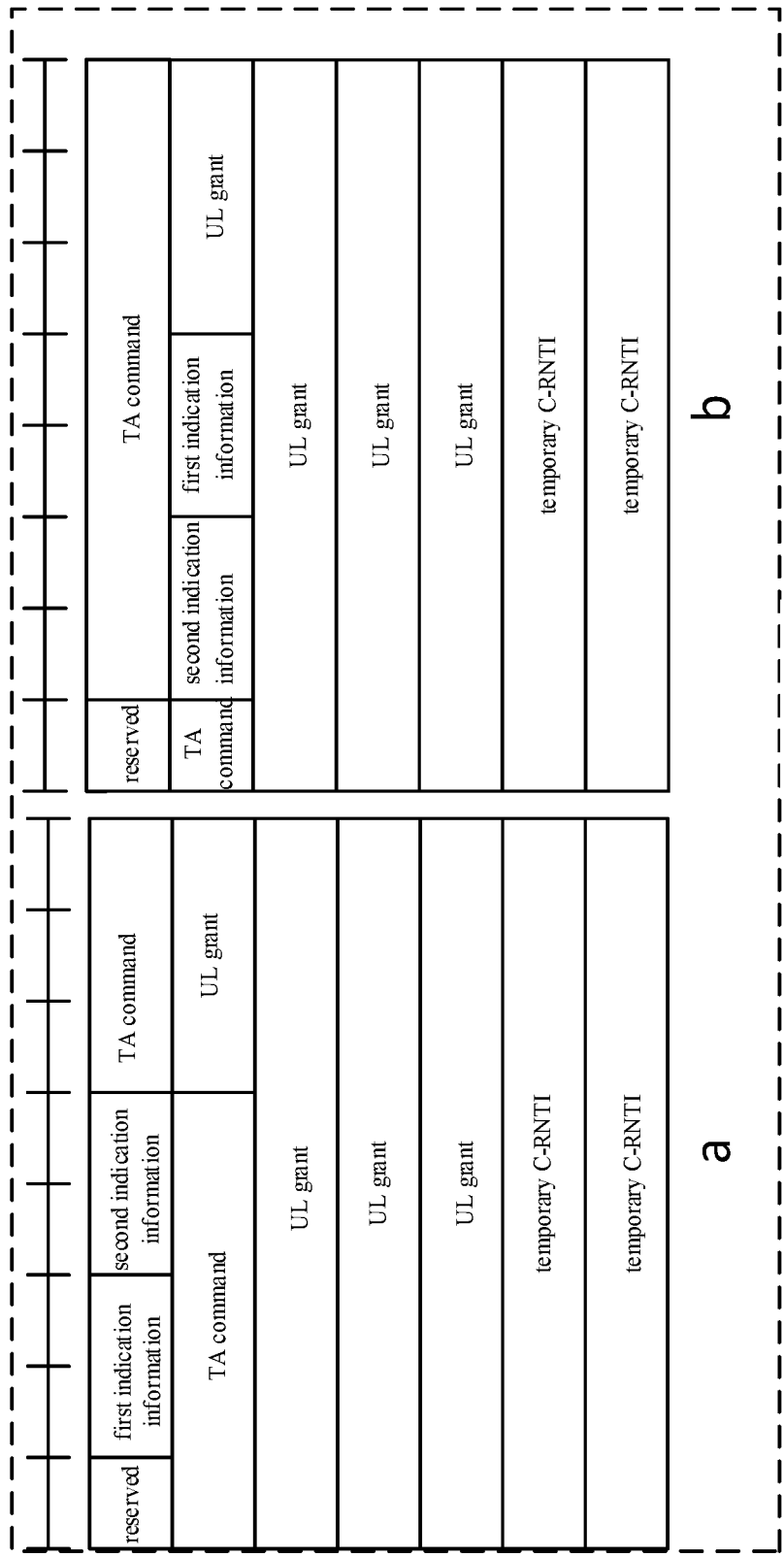
FIG. 6 is a schematic diagram of second indication information provided by an exemplary embodiment of the present disclosure.

That is to say, the terminal may extract information of some bits in the middle part of the TA command field to obtain the second indication information. Furthermore, when the RAR message carries the first indication information and the second indication information, the first indication information may occupy some bits in the head part of the TA command field, or occupy some bits in the tail part of the TA command field. In this case, the second indication information may be next to the first indication information, for example, as shown in (a) and (b) in FIG. 6.

The terminal can also obtain the second indication information from some bits in the head part of the TA command field. Alternatively, the terminal can also obtain the second indication information from some bits in the tail part of the TA command field. That is to say, the bits where the first indication information and the second indication information are located may not be limited. As an example, the first indication information and the second indication information can follow the principle of being set at one end of the TA command field during a carrying process.

In some embodiments, a reserved field of the RAR message further includes third indication information, and the third indication information is used for determining a format of the RAR message as a first RAR format or a second RAR format.

Optionally, the first RAR format is used for indicating that the target uplink transmission scheduled by the RAR message is carried on an unlicensed spectrum, and the second RAR format is used for indicating that the target uplink transmission scheduled by the RAR message is carried on a licensed spectrum.

Optionally, the first RAR format includes the first indication information, and the second RAR format does not include the first indication information.

The reserved field is a reserved bit R in the RAR message.

The terminal can distinguish the RAR message by obtaining the third indication information in the RAR message, i.e., distinguishing whether the RAR message is in the first RAR format or the second RAR format.

For example, when R is set to 1, it means that the target uplink transmission scheduled by the RAR message is carried on an unlicensed spectrum. When R is set to 0, it means that the target uplink transmission scheduled by the RAR message is carried on the licensed spectrum. The terminal can interpret the RAR message in a respective way according to the reserved field.

Optionally, a size of the first RAR format and a size of the second RAR format may be the same.

In an embodiment of the present disclosure, the random access response (RAR) message is received, and at least one of the first indication information and the second indication information is obtained from the RAR message. The first indication information is used for determining the target channel access mode corresponding to the target uplink transmission, and the second indication information is used for determining the time domain position of the target uplink transmission. That is, the target channel access mode and the time domain position corresponding to the target uplink transmission can be determined through the RAR message, which enables the UE to implement random access on an unlicensed spectrum.

Further, by indicating the first indication information and/or the second indication information based on the redundant bit in the existing TA command field, it is possible to use the existing command field that can only represent one piece of information to represent multiple pieces of information, without adding a new command field. This can reduce bit overhead and complexity for design and implementation, thus also ensuring the same size of the new and old RAR formats.

Figure 7:
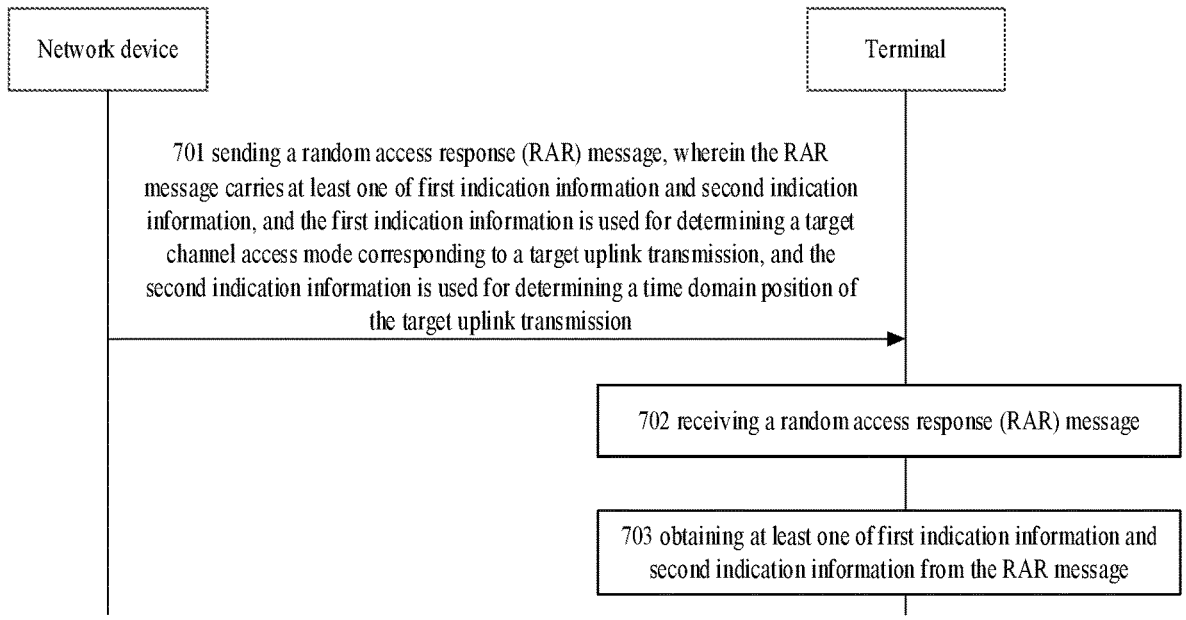
FIG. 7 is a flowchart of an information indication method provided by another exemplary embodiment of the present disclosure.

Reference is made to FIG. 7, which is a flowchart of an information indication method according to an exemplary embodiment. The information indication method can be applied to the implementation environment shown in FIG. 2, and can include at least part of the following contents.

In step 701, a network device sends a random access response (RAR) message, and the RAR message carries at least one of first indication information and second indication information. The first indication information is used for determining a target channel access mode corresponding to a target uplink transmission, and the second indication information is used for determining a time domain position of the target uplink transmission.

As an example, the target uplink transmission is the PUSCH of Msg3 in the random access procedure.

For the network device, after Msg1 is received, at least one of the first indication information and the second indication information can be carried in the RAR message, so as to indicate the target channel access mode corresponding to the target uplink transmission through the first indication information, and/or to indicate the time domain position of the target uplink transmission through the second indication information.

At least one of the first indication information and the second indication information is carried by a redundant bit in the RAR message.

For the specific implementation, reference can be made to the step 302 in the embodiment shown in FIG. 3 above.

Further, the first indication information is obtained through some bits in a timing advance (TA) command field in the RAR message. Alternatively, the first indication information is obtained through all bits in the TA command field in the RAR message.

That is, the network device may carry the first indication information through some bits in the TA command field, or carry the first indication information through all the bits in the TA command field.

The first indication information is obtained through some bits located in a head part of the TA command field. Alternatively, the first indication information is obtained through some bits located in a tail part of the TA command field.

That is to say, in a case where the network device carries the first indication information through some bits in the TA command field in the RAR message, the head part of the TA command field can be set to carry the first indication information. Further, it is also possible to set the tail part of the TA command field to carry the first indication information.

As an example, the target channel access mode is a channel access mode in a group of channel access modes, and the group of channel access modes includes at least two channel access modes.

For the specific implementations, reference can be made to the step 302 in the embodiment shown in FIG. 3 above.

Further, the group of channel access modes is preset or indicated by the network device. That is to say, the group of channel access modes may be pre-agreed. Alternatively, it may be indicated and grouped by the network device according to an actual situation. Optionally, in a case where the group of channel access modes is indicated by the network device, the indication signaling may be a higher layer signaling.

In some embodiment, the group of channel access modes includes one of the following situations: a first type of channel access mode, a second type of channel access mode, and a third type of channel access mode; or a first type of channel access mode and a second type of channel access mode. The first type of channel access mode includes at least one channel access priority class, and the second type of channel access mode includes at least one detection time interval.

For the specific implementation, reference can be made to the step 302 in the embodiment shown in FIG. 3 above.

Further, the group of channel access modes includes a first type of channel access mode and a second type of channel access mode. The first type of channel access mode includes one channel access priority class, and the second type of channel access mode includes one detection time interval.

For the specific implementation, reference can be made to the step 302 in the embodiment shown in FIG. 3 above.

Optionally, the first indication information includes a channel access type and a channel access parameter of the target channel access mode. In a case where the channel access type is the first type of channel access, the channel access parameter includes at least one channel access priority class. In a case where the channel access type is the second type of channel access, the channel access parameter includes at least one detection time interval.

For the specific implementation, reference can be made to the step 302 in the embodiment shown in FIG. 3 above.

After introducing the first instruction information, the second instruction information will be introduced next. As an example, the second indication information may include a first offset value in a set of offset values, and the first offset value is used for determining the time domain position of the target uplink transmission.

In the licensed spectrum, the time domain position of the target uplink transmission is determined according to a designated offset value and K2 value. The K2 value is determined according to a PUSCH time domain resource allocation field, and the designated offset value is related to the subcarrier interval of PUSCH.

In some embodiment, the time domain position of the target uplink transmission needs to be determined according to the first offset value and the K2 value. As different from the above designated offset value, the first offset value is not a fixed value, but a value in the set of offset values corresponding to different subcarriers.

The set of offset values corresponds to the first subcarrier interval. Optionally, the first subcarrier interval is a subcarrier interval corresponding to the target uplink transmission. In other words, the set of offset values is a set of offset values which is in correspondence with the subcarrier interval corresponding to the target uplink transmission.

Optionally, there is a one-to-one correspondence between different subcarrier intervals and different sets of offset values.

Optionally, multiple subcarrier intervals correspond to the same set of offset values.

The set of offset values is preset or indicated by the network device. In other words, the set of offset values may be preset, or may be set by the network device. Optionally, in a case where the set of offset values is indicated by the network device, the indication signaling may be a higher layer signaling.

Optionally, a second offset value is carried in a physical uplink shared channel (PUSCH) time domain resource allocation field in an uplink scheduling grant in the RAR message, and the second offset value and the first offset value are used for jointly determining the time domain position of the target uplink transmission.

The second offset value is the above K2 value, and the second offset value is located in the PUSCH time domain resource allocation field in the uplink scheduling grant in the RAR message.

In some embodiments, the second indication information includes a third offset value in the PUSCH time domain resource allocation field in the uplink scheduling grant in the RAR message. The third offset value is used for indicating a time interval between an end slot of a downlink transmission opportunity to which the RAR message belongs and a slot to which the target uplink transmission belongs.

For the specific implementation, reference can be made to the step 302 in the embodiment shown in FIG. 3 above.

Optionally, the second indication information is obtained through some bits in the TA command field in the RAR message. Alternatively, the second indication information is obtained through all bits in the TA command field in the RAR message.

That is, the network device may set some bits in the TA command field to carry the second indication information, or set all bits in the TA command field to carry the second indication information.

The second indication information is obtained through some bits in the middle part of the TA command field. That is to say, the network device may set the second indication information to be located in some bits in the middle part of the TA command field.

In some embodiments, a reserved field of the RAR message further includes third indication information, and the third indication information is used for determining a format of the RAR message as a first RAR format or a second RAR format.

Optionally, the first RAR format is used for indicating that the target uplink transmission scheduled by the RAR message is carried on an unlicensed spectrum, and the second RAR format is used for indicating that the target uplink transmission scheduled by the RAR message is carried on a licensed spectrum.

Optionally, the first RAR format includes the first indication information, and the second RAR format does not include the first indication information.

The network device may also add third indication information to the RAR message. For example, the third indication information may be added to the reserved field so as to indicate the format of the RAR message through the third indication information, i.e., indicating that the RAR message is in the first RAR format or the second RAR format.

Optionally, a size of the first RAR format and a size of the second RAR format may be the same.

In step 702, the terminal receives a random access response (RAR) message.

For the specific implementation, reference can be made to the step 301 in the embodiment shown in FIG. 3 above.

That is, the terminal receives the RAR message sent by the network device.

In step 703, the terminal obtains at least one of the first indication information and the second indication information from the RAR message.

For the specific implementation, reference can be made to the step 302 in the embodiment shown in FIG. 3 above.

In an embodiment of the present disclosure, the random access response (RAR) message is received, and at least one of the first indication information and the second indication information is obtained from the RAR message. The first indication information is used for determining the target channel access mode corresponding to the target uplink transmission, and the second indication information is used for determining the time domain position of the target uplink transmission. That is, the target channel access mode and the time domain position corresponding to the target uplink transmission can be determined through the RAR message, which enables the UE to implement random access on an unlicensed spectrum.

Further, by indicating the first indication information and/or the second indication information based on the redundant bit in the existing TA command field, it is possible to use the existing command field that can only represent one piece of information to represent multiple pieces of information, without adding a new command field. This can reduce bit overhead and the complexity for design and implementation, thus also ensuring the same size of the new and old RAR formats.

Figure 8:
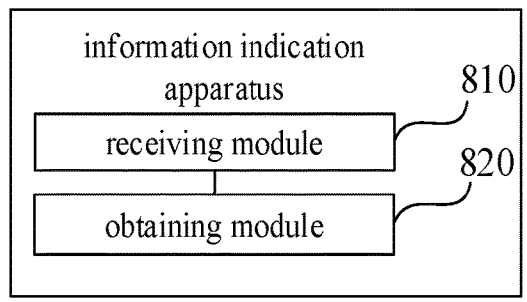
FIG. 8 is a schematic structural diagram of an information indication apparatus provided by an exemplary embodiment of the present disclosure.

Reference is made to FIG. 8, which is a structural diagram showing an information indication apparatus according to an exemplary embodiment. The apparatus can be configured in a terminal, and may include: a receiving module 810, configured to receive a random access response (RAR) message; and an obtaining module 820, configured to obtain at least one of first indication information and second indication information from the RAR message. The first indication information is used for determining a target channel access mode corresponding to a target uplink transmission, and the second indication information is used for determining a time domain position of the target uplink transmission.

In a possible implementation of the present disclosure, the obtaining module 820 is configured to obtain at least one of the first indication information and the second indication information from a redundant bit in the RAR message.

In a possible implementation of the present disclosure, the target channel access mode is a channel access mode in a group of channel access modes, and the group of channel access modes includes at least two channel access modes.

In a possible implementation of the present disclosure, the group of channel access modes is indicated by a network device or preset.

In a possible implementation of the present disclosure, the group of channel access modes includes one of the following: a first type of channel access mode, a second type of channel access mode, and a third type of channel access mode; or a first type of channel access mode and a second type of channel access mode. The first type of channel access mode includes at least one channel access priority class, and the second type of channel access mode includes at least one detection time interval.

In a possible implementation of the present disclosure, the group of channel access modes includes a first type of channel access mode and a second type of channel access mode. The first type of channel access mode includes one channel access priority class, and the second type of channel access mode includes one detection time interval.

In a possible implementation of the present disclosure, the first indication information includes a channel access type and a channel access parameter of the target channel access mode. In a case where the channel access type is the first type of channel access, the channel access parameter includes at least one channel access priority class; and/or, in a case where the channel access type is the second type of channel access, the channel access parameter includes at least one detection time interval.

In a possible implementation of the present disclosure, the first indication information is obtained through some bits in a timing advance (TA) command field in the RAR message; or the first indication information is obtained through all bits in the TA command field in the RAR message.

In a possible implementation of the present disclosure, the first indication information is obtained through some bits located in a head part of the TA command field; or, the first indication information is obtained through some bits located in a tail part of the TA command field.

In a possible implementation of the present disclosure, the second indication information includes a first offset value in a set of offset values, and the first offset value is used for determining the time domain position of the target uplink transmission.

In a possible implementation of the present disclosure, the set of offset values is indicated by the network device or preset.

In a possible implementation of the present disclosure, the set of offset values is a set of offset values which is in correspondence with a subcarrier interval corresponding to the target uplink transmission.

In a possible implementation of the present disclosure, the obtaining module 820 is further configured to obtain a second offset value in a physical uplink shared channel (PUSCH) time domain resource allocation field in an uplink scheduling grant in the RAR message, and the second offset value and the first offset value are used for jointly determining the time domain position of the target uplink transmission.

In a possible implementation of the present disclosure, the second indication information is obtained through some bits in the TA command field in the RAR message; or the second indication information is obtained through all bits in the TA command field in the RAR message.

In a possible implementation of the present disclosure, the second indication information is obtained through some bits in middle part of the TA command field.

In a possible implementation of the present disclosure, the obtaining module 820 is further configured to: obtain a third offset value from the PUSCH time domain resource allocation field in the uplink scheduling grant in the RAR message, wherein the third offset value is used for indicating a time interval between an end slot of a downlink transmission opportunity to which the RAR message belongs and a slot to which the target uplink transmission belongs; and determine the third offset value as the second indication information.

In a possible implementation of the present disclosure, a reserved field of the RAR message further includes third indication information, and the third indication information is used for determining a format of the RAR message as a first RAR format or a second RAR format. The first RAR format is used for indicating that the target uplink transmission scheduled by the RAR message is carried on an unlicensed spectrum, and the second RAR format is used for indicating that the target uplink transmission scheduled by the RAR message is carried on a licensed spectrum.

In a possible implementation of the present disclosure, the target uplink transmission is the PUSCH of Msg3 in the random access procedure.

In an embodiment of the present disclosure, the random access response (RAR) message is received, and at least one of the first indication information and the second indication information is obtained from the RAR message. The first indication information is used for determining the target channel access mode corresponding to the target uplink transmission, and the second indication information is used for determining the time domain position of the target uplink transmission. That is, the target channel access mode and the time domain position corresponding to the target uplink transmission can be determined through the RAR message, which enables the UE to implement random access on an unlicensed spectrum.

Figure 9:
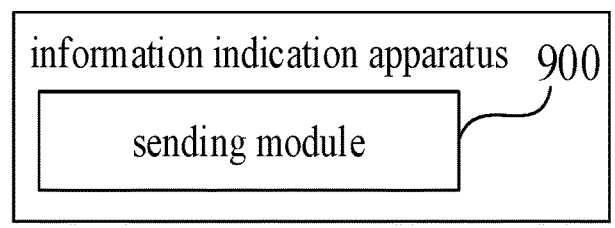
FIG. 9 is a schematic structural diagram of an information indication apparatus provided by another exemplary embodiment of the present disclosure.

Reference is made to FIG. 9, which is a structural diagram showing an information indication apparatus according to an exemplary embodiment. The apparatus may be configured in a terminal, and may include: a sending module 900, configured to send a random access response (RAR) message. The RAR message carries at least one of first indication information and second indication information. The first indication information is used for determining a target channel access mode corresponding to a target uplink transmission, and the second indication information is used for determining a time domain position of the target uplink transmission.

In a possible implementation of the present disclosure, at least one of the first indication information and the second indication information is carried by a redundant bit in the RAR message.

In a possible implementation of the present disclosure, the target channel access mode is a channel access mode in a group of channel access modes, and the group of channel access modes includes at least two channel access modes.

In a possible implementation of the present disclosure, the group of channel access modes is indicated by the network device or preset.

In a possible implementation of the present disclosure, the group of channel access modes includes one of the following: a first type of channel access mode, a second type of channel access mode, and a third type of channel access mode; or a first type of channel access mode and a second type of channel access mode. The first type of channel access mode includes at least one channel access priority class, and the second type of channel access mode includes at least one detection time interval.

In a possible implementation of the present disclosure, the group of channel access modes includes a first type of channel access mode and a second type of channel access mode. The first type of channel access mode includes one channel access priority class, and the second type of channel access mode includes one detection time interval.

In a possible implementation of the present disclosure, the first indication information includes a channel access type and a channel access parameter of the target channel access mode. In a case where the channel access type is the first type of channel access, the channel access parameter includes at least one channel access priority class; and/or in a case where the channel access type is the second type of channel access, the channel access parameter includes at least one detection time interval.

In a possible implementation of the present disclosure, the first indication information is obtained through some bits in a timing advance (TA) command field in the RAR message. Alternatively, the first indication information is obtained through all bits in the TA command field in the RAR message.

In a possible implementation of the present disclosure, the first indication information is obtained through some bits located in a head part of the TA command field. Alternatively, the first indication information is obtained through some bits located in a tail part of the TA command field.

In a possible implementation of the present disclosure, the second indication information includes a first offset value in a set of offset values, and the first offset value is used for determining the time domain position of the target uplink transmission.

In a possible implementation of the present disclosure, the set of offset values is indicated by the network device or preset.

In a possible implementation of the present disclosure, the set of offset values is a set of offset values which is in correspondence with a subcarrier interval corresponding to the target uplink transmission.

In a possible implementation of the present disclosure, a second offset value is carried in a physical uplink shared channel (PUSCH) time domain resource allocation field in an uplink scheduling grant in the RAR message, and the second offset value and the first offset value are used for jointly determining the time domain position of the target uplink transmission.

In a possible implementation of the present disclosure, the second indication information is obtained through some bits in the TA command field in the RAR message. Alternatively, the second indication information is obtained through all bits in the TA command field in the RAR message.

In a possible implementation of the present disclosure, the second indication information is obtained through some bits in middle part of the TA command field.

In a possible implementation of the present disclosure, the second indication information includes a third offset value in the PUSCH time domain resource allocation field in the uplink scheduling grant in the RAR message. The third offset value is used for indicating a time interval between an end slot of a downlink transmission opportunity to which the RAR message belongs and a slot to which the target uplink transmission belongs.

In a possible implementation of the present disclosure, the sending module 900 is further configured to: include third indication information further in a reserved field of the RAR message. The third indication information is used for determining a format of the RAR message as a first RAR format or a second RAR format. The first RAR format is used for indicating that the target uplink transmission scheduled by the RAR message is carried on an unlicensed spectrum, and the second RAR format is used for indicating that the target uplink transmission scheduled by the RAR message is carried on a licensed spectrum.

In a possible implementation of the present disclosure, the target uplink transmission is the PUSCH of Msg3 in the random access procedure.

In an embodiment of the present disclosure, the random access response (RAR) message is received, and at least one of the first indication information and the second indication information is obtained from the RAR message. The first indication information is used for determining the target channel access mode corresponding to the target uplink transmission, and the second indication information is used for determining the time domain position of the target uplink transmission. That is, the target channel access mode and the time domain position corresponding to the target uplink transmission can be determined through the RAR message, which enables the UE to implement random access on an unlicensed spectrum.

Figure 10:
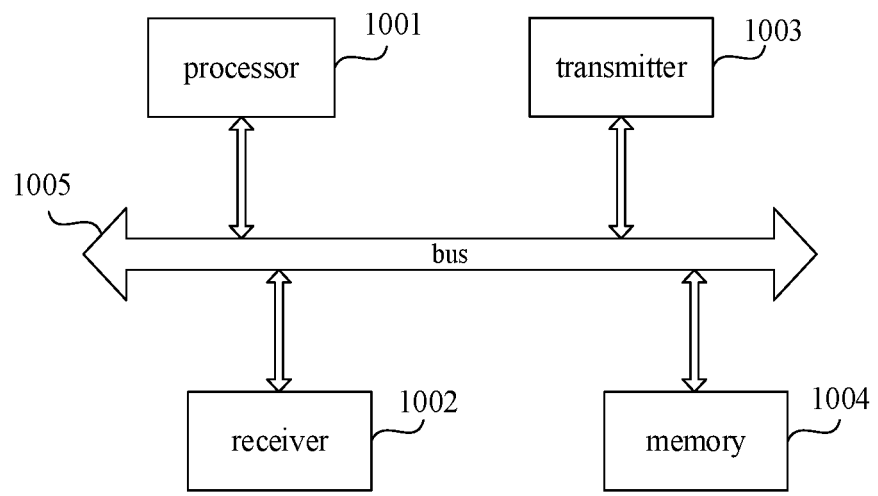
FIG. 10 is a schematic structural diagram of a terminal provided by an exemplary embodiment of the present disclosure.

Reference is made to FIG. 10, which shows a schematic structural diagram of a terminal provided by an exemplary embodiment of the present disclosure. The terminal includes: a processor 1001, a receiver 1002, a transmitter 1003, a memory 1004, and a bus 1005.

The processor 1001 includes one or more processing cores. The processor 1001 executes various functional applications and information processing by running software programs and modules.

The receiver 1002 and the transmitter 1003 may be implemented as one communication component, which communication component may be a communication chip.

The memory 1004 is connected to the processor 1001 through the bus 1005.

The memory 1004 may be configured to store at least one instruction. The processor 1001 is configured to execute the at least one instruction, so as to implement each step executed by the first IAB base station in the foregoing various method embodiments.

In addition, the memory 1004 can be implemented by any type of volatile or non-volatile storage device or a combination thereof. The volatile or non-volatile storage device includes, but is not limited to, a magnetic disk or an optical disk, an electrically erasable and programmable read-only memory (EEPROM), an erasable programmable read-only memory (EPROM), a static random access memory (SRAM), a read-only memory (ROM), a magnetic memory, a flash memory, a programmable read-only memory (PROM).

The present disclosure provides a computer-readable storage medium in which at least one instruction is stored. The at least one instruction is loaded and executed by the processor to implement the information indication method provided by the foregoing various method embodiments.

The present disclosure also provides a computer program product that, when running on a computer, causes the computer to execute the information indication method provided by the foregoing various method embodiments.

Figure 11:
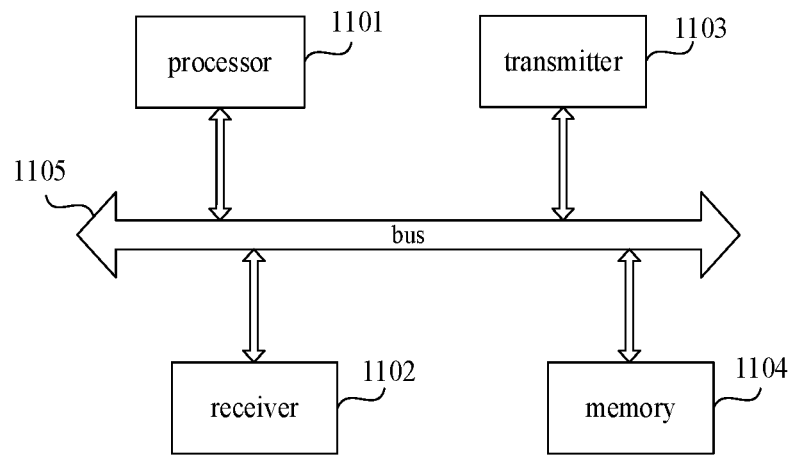
FIG. 11 is a schematic structural diagram of a network device provided by an exemplary embodiment of the present disclosure.

Reference is made to FIG. 11, which shows a schematic structural diagram of a network device provided by an exemplary embodiment of the present disclosure. The network device includes: a processor 1101, a receiver 1102, a transmitter 1103, a memory 1104, and a bus 1105.

The processor 1101 includes one or more processing cores. The processor 1101 executes various functional applications and information processing by running software programs and modules.

The receiver 1102 and the transmitter 1103 may be implemented as one communication component, which communication component may be a communication chip.

The memory 1104 is connected to the processor 1101 through the bus 1105.

The memory 1104 may be configured to store at least one instruction. The processor 1101 is configured to execute the at least one instruction, so as to implement each step executed by the second IAB base station in the foregoing various method embodiments.

In addition, the memory 1104 can be implemented by any type of volatile or non-volatile storage device or a combination thereof. The volatile or non-volatile storage device includes, but is not limited to, a magnetic disk or an optical disk, an electrically erasable and programmable read-only memory (EEPROM), an erasable programmable read-only memory (EPROM), a static random access memory (SRAM), a read-only memory (ROM), a magnetic memory, a flash memory, a programmable read-only memory (PROM).

The present disclosure provides a computer-readable storage medium in which at least one instruction is stored. The at least one instruction is loaded and executed by the processor to implement the information indication method provided by the foregoing various method embodiments.

The present disclosure also provides a computer program product that, when running on a computer, causes the computer to execute the information indication method provided by the foregoing various method embodiments.

A person skilled in the art should understand that in the foregoing one or more examples, the functions described in embodiments of the present disclosure can be implemented by hardware, software, firmware, or any combination thereof. When implemented by the software, these functions can be stored in a computer readable medium, or be transmitted as one or more instructions or codes on the computer readable medium. The computer readable medium includes a computer storage medium and a communication medium. The communication medium includes any medium that enables a computer program to be transmitted from one place to another place. The storage medium can be any available medium that can be accessed by a general-purpose or special-purpose computer.

The above descriptions are only preferred embodiments of the present disclosure and are not intended to limit the present disclosure. Any modification, equivalent replacement, improvement and the like within the spirit and principle of the present disclosure shall be included in the protection scope of the present disclosure.

What is claimed is:

1. An information indication method, applied to a terminal, and comprising:
   receiving a random access response RAR message; and
   obtaining at least one of first indication information and second indication information from the RAR message, wherein the first indication information is used for determining a target channel access mode corresponding to a target uplink transmission, and the second indication information is used for determining a time domain position of the target uplink transmission, wherein the second indication information comprises a first offset value in a set of offset values, and the first offset value is used for determining the time domain position of the target uplink transmission;
   wherein the set of offset values is a set of offset values which is in correspondence with a subcarrier interval corresponding to the target uplink transmission;
   wherein the target channel access mode is a channel access mode in a group of channel access modes, and the group of channel access modes comprises at least two channel access modes;
   wherein the group of channel access modes is preset;
   wherein the group of channel access modes comprises:
   a first type of channel access mode, a second type of channel access mode, and a third type of channel access mode;
   wherein the first type of channel access mode comprises at least one channel access priority class, and the second type of channel access mode comprises at least one detection time interval;
   wherein the method further comprises:
   obtaining a second offset value in a physical uplink shared channel PUSCH time domain resource allocation field in an uplink scheduling grant in the RAR message, wherein the second offset value and the first offset value are used for jointly determining the time domain position of the target uplink transmission; and
   wherein the target uplink transmission is a physical uplink shared channel PUSCH of Message 3 in a random access procedure.

2. The method according to claim 1, wherein the obtaining at least one of the first indication information and the second indication information from the RAR message comprises:
    obtaining at least one of the first indication information and the second indication information from a redundant bit in the RAR message.

3. The method according to claim 1, wherein the set of offset values is indicated by a network device or preset.

4. An information indication method, applied to a network device, and comprising:
    sending a random access response RAR message, wherein the RAR message carries at least one of first indication information and second indication information, wherein the first indication information is used for determining a target channel access mode corresponding to a target uplink transmission, and the second indication information is used for determining a time domain position of the target uplink transmission,
    wherein the second indication information comprises a first offset value in a set of offset values, and the first offset value is used for determining the time domain position of the target uplink transmission;
    wherein the set of offset values is a set of offset values which is in correspondence with a subcarrier interval corresponding to the target uplink transmission;
    wherein the target channel access mode is a channel access mode in a group of channel access modes, and the group of channel access modes comprises at least two channel access modes;
    wherein the group of channel access modes is preset;
    wherein the group of channel access modes comprises:
    a first type of channel access mode, a second type of channel access mode, and a third type of channel access mode;
    wherein the first type of channel access mode comprises at least one channel access priority class, and the second type of channel access mode comprises at least one detection time interval;
    wherein a second offset value is carried in a physical uplink shared channel PUSCH time domain resource allocation field in an uplink scheduling grant in the RAR message, wherein the second offset value and the first offset value are used for jointly determining the time domain position of the target uplink transmission; and
    wherein the target uplink transmission is a physical uplink shared channel PUSCH of Message 3 in a random access procedure.

5. The method according to claim 4, wherein at least one of the first indication information and the second indication information is carried by a redundant bit in the RAR message.

6. The method according to claim 4, wherein the set of offset values is indicated by the network device or preset.

7. A device, wherein the device comprises a processor and a memory, the memory stores at least one instruction, and the at least one instruction is configured to be executed by the processor to implement steps of an information indication method, applied to a terminal, and comprising:
    receiving a random access response RAR message; and
    obtaining at least one of first indication information and second indication information from the RAR message, wherein the first indication information is used for determining a target channel access mode corresponding to a target uplink transmission, and the second indication information is used for determining a time domain position of the target uplink transmission,
    wherein the second indication information comprises a first offset value in a set of offset values, and the first offset value is used for determining the time domain position of the target uplink transmission;
    wherein the set of offset values is a set of offset values which is in correspondence with a subcarrier interval corresponding to the target uplink transmission;
    wherein the target channel access mode is a channel access mode in a group of channel access modes, and the group of channel access modes comprises at least two channel access modes;
    wherein the group of channel access modes is preset;
    wherein the group of channel access modes comprises:
    a first type of channel access mode, a second type of channel access mode, and a third type of channel access mode;
    wherein the first type of channel access mode comprises at least one channel access priority class, and the second type of channel access mode comprises at least one detection time interval;
    wherein the method further comprises:
    obtaining a second offset value in a physical uplink shared channel PUSCH time domain resource allocation field in an uplink scheduling grant in the RAR message, wherein the second offset value and the first offset value are used for jointly determining the time domain position of the target uplink transmission; and
    wherein the target uplink transmission is a physical uplink shared channel PUSCH of Message 3 in a random access procedure.

8. A device, wherein the device comprises a processor and a memory, the memory stores at least one instruction, and the at least one instruction is configured to be executed by the processor to implement steps of the method, the method comprising:
    sending a random access response RAR message, wherein the RAR message carries at least one of first indication information and second indication information, wherein the first indication information is used for determining a target channel access mode corresponding to a target uplink transmission, and the second indication information is used for determining a time domain position of the target uplink transmission,
    wherein the second indication information comprises a first offset value in a set of offset values, and the first offset value is used for determining the time domain position of the target uplink transmission;
    wherein the set of offset values is a set of offset values which is in correspondence with a subcarrier interval corresponding to the target uplink transmission;
    wherein the target channel access mode is a channel access mode in a group of channel access modes, and the group of channel access modes comprises at least two channel access modes;
    wherein the group of channel access modes is preset;
    wherein the group of channel access modes comprises:
    a first type of channel access mode, a second type of channel access mode, and a third type of channel access mode;
    wherein the first type of channel access mode comprises at least one channel access priority class, and the second type of channel access mode comprises at least one detection time interval;
    wherein a second offset value is carried in a physical uplink shared channel PUSCH time domain resource allocation field in an uplink scheduling grant in the RAR message, wherein the second offset value and the first offset value are used for jointly determining the time domain position of the target uplink transmission; and wherein the target uplink transmission is a physical uplink shared channel PUSCH of Message 3 in a random access procedure.

* * * * *